H. H. BRYANT.
Loom-Shuttles.
No. 134,848.  Patented Jan. 14, 1873.
Fig. 5.
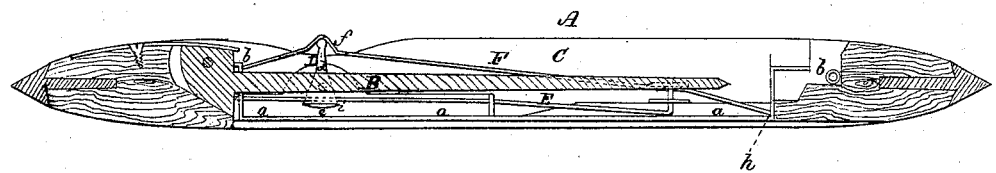
Fig. 1.
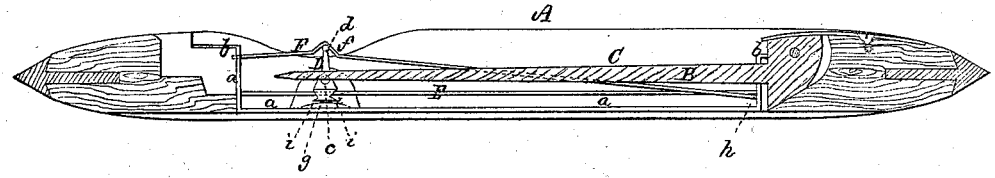
Fig. 3.  Fig. 2.  Fig. 4.
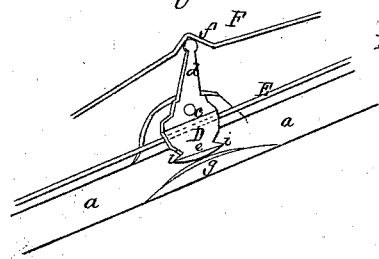 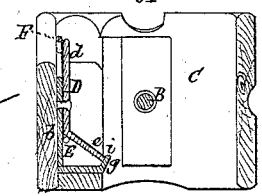 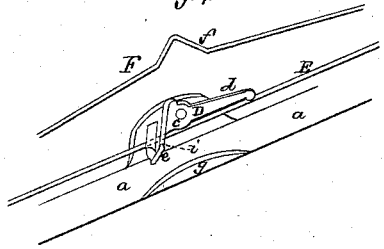
Witnesses.  Hezekiah H. Bryant.
J. H. Mills  F. Curtis, Atty.
N. E. Boardman.
AM. PHOTO-LITHOGRAPHIC CO. N.Y. (OSBORNE'S PROCESS.)

UNITED STATES PATENT OFFICE.

HEZEKIAH H. BRYANT, OF BOSTON, MASSACHUSETTS.

IMPROVEMENT IN LOOM-SHUTTLES.

Specification forming part of Letters Patent No. 134,848, dated January 14, 1873.

*To all whom it may concern:*

Be it known that I, H. H. BRYANT, of Boston, Suffolk county, State of Massachusetts, have invented certain Improvements in Weavers' Shuttles, of which the following is a specification:

The object of this invention is that of providing suitable mechanism for shuttles, which, while it serves to break the weft-thread upon the occurrence of a "float," and thereby causes the loom to stop through the action of its "stop-motion," shall not be put in operation by any other cause than that producing "floats" or "pick-outs." My invention is valuable for its cheapness, simplicity, and its not being liable to be thrown out of working order by the severe concussions incident to the operation of a shuttle; and it consists of a dog supported in a given position by a suitable spring, and having a weft-catcher arm and a self-adjusting guard to shield the dog from being acted upon by other causes than those producing floats, the whole constructed and disposed within the bobbin-chamber of a shuttle, as will be hereinafter shown and described. I also exhibit an arrangement of said mechanism suitable to adapt it for use in either right or left hand shuttles. It being necessary to place the dog upon that side of the shuttle which is opposite to its eduction-tube, it becomes necessary in left-hand shuttles to place the dog at a point near the base of the spindle, for the purpose of preventing the weft-thread from catching there and breaking. A like location of the dog in right-hand shuttles will also be necessary where the weft-thread unwinds to the left instead of the right.

The operation of my invention is as follows: Whenever, as is often the case, one or more threads of the warp protrude from the face of the shed by clinging, the one thread to another, as the shed is changed by the harness, the threads so protruding will be floated over the dog by the guard which shields it from their contact, as such threads will not have sufficient power to depress said guard; but on the occurrence of a "float" the threads which are tied together by a broken thread will have enough power to depress the guard, and, catching on the dog, will throw it from a perpendicular to a horizontal position, wherein its construction enables it to break the weft-thread and so stop the loom through the action of its stop-motion.

Another noticeable feature of my invention consists in providing a suitable support for my mechanism that shall span the whole length of the bobbin-chamber, and of providing a suitable recess in said chamber to receive the same without intruding upon the space allotted to the bobbin.

In the accompanying drawing forming part of this specification, Figure 1 is a longitudinal section, and Fig. 2 a transverse section of a shuttle as provided with my invention. Fig. 3 is a perspective view of said invention.

In said drawing, A denotes an ordinary shuttle-body, B being its cop-spindle, and C its bobbin-chamber. In that wall of said chamber which is opposite to the eduction-tube I form a recess suitable to receive a proper support for my mechanism, as shown at *a a a*, said support being firmly fixed to the shuttle at *b b*. Upon this support, at a point near the free end on the spindle B, I pivot, upon a fulcrum, *c*, an oscillating lever or dog, D, consisting of an upright arm, *d*, and a longitudinal arm or weft-catcher, *e*, the latter being provided with two teeth, *i i*, for the purpose of catching and breaking the weft-thread when the dog is thrown into an oblique or horizontal position, as shown in Fig. 4. E in the drawing represents a long spring placed below and pressing against the under side of the weft-catcher *e*, which serves to maintain the arm *d* of the dog in an upright and the weft-catcher *e* in a longitudinal position during the ordinary working of the loom. At a point opposite that where the dog is pivoted I affix to the support *a a a* a lip or guard, *g*, for the purpose of preventing the weft from catching on the weft-catcher *e* while the same is in a longitudinal position. The spring E is made fast to the support *a a a* at one end, shown at *h*, while the other is left free to play in a suitable bearing provided in the opposite end of the support *a a a*. The guard is adapted for use in any float-preventive mechanism having a dog or trigger intended to be operated upon by those threads of a warp which cause a "float" or "pick-out."

In Fig. 1 said guard F is shown to consist of a long spring affixed to the support *a a a*, and disposed above the spring E, substantially parallel thereto. The other end of said guard is left practically free, although it is confined within a vertical slot or chamber formed by the support $a\ a\ a$ and the wall of the shuttle, said arrangement being made to permit that end of the guard to be depressed a half inch, more or less. Said guard is provided with a projection formed on the guard in any suitable manner—in this instance by bending the guard, as shown at $f$—for the purpose of insuring its depression when acted upon by the threads which would produce a "float." This projection is disposed immediately opposite the upper end of the arm $d$ of the dog D, and is slightly elevated above said arm.

The construction and arrangement of the guard F may be modified considerably without departure from the principle of my invention; and it may be made by substituting for the projection $f$ a series of corrugations, or both may be discarded if a small rod of wire sufficiently yielding is used; but this latter method would involve the necessity of using a smaller wire than would prove substantial in practical use.

Fig. 5 in the drawing represents my invention as applied to a "left-hand" shuttle, this figure being a longitudinal section, and the arrangement of dog, guard, and spring being substantially the same as in Fig. 1, with this difference, that the dog and free end of the guard are disposed adjacent to the pivot or base of the cop-spindle, while in said Fig. 1 they are near its point.

Claims.

1. In combination with a float-preventive mechanism, the guard F or its equivalent, substantially as and for the purpose specified.

2. The herein-described combination and arrangement of the spring E and the dog D, composed of the upright arm $d$ and the longitudinal toothed weft-catcher $e$, the whole affixed to the support $a\ a\ a$ and to the shuttle, substantially as or for the purposes set forth.

HEZEKIAH H. BRYANT.

Witnesses:
F. CURTIS,
W. E. BOARDMAN.